Patented Sept. 28, 1943

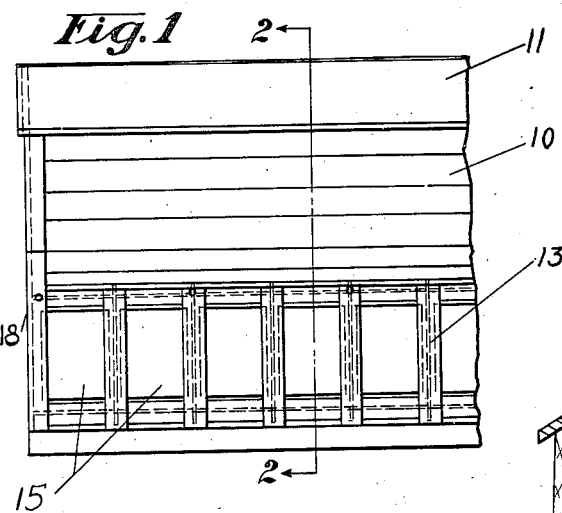
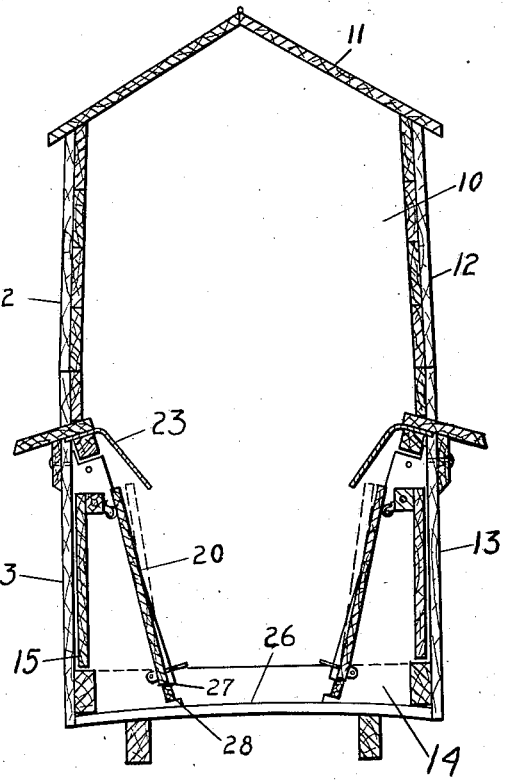
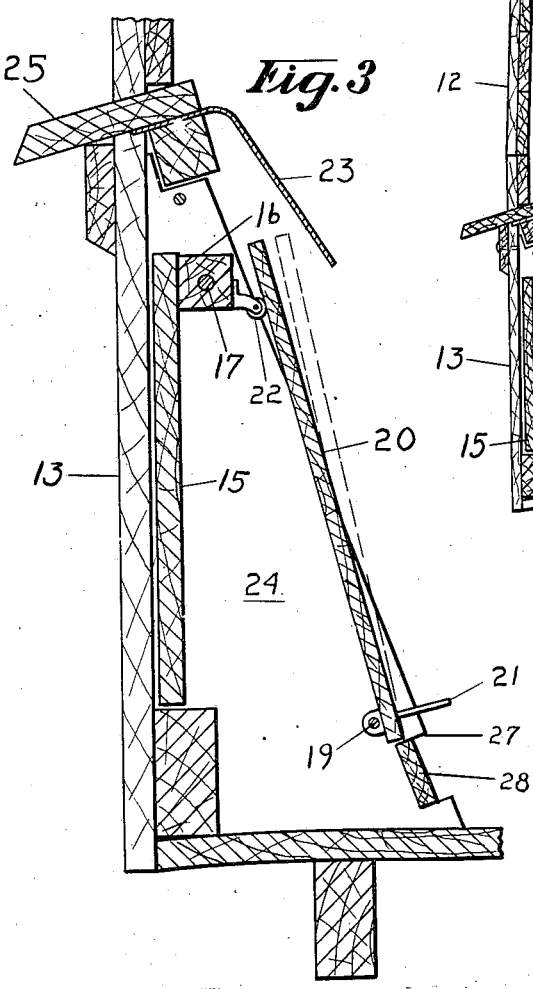

2,330,454

UNITED STATES PATENT OFFICE 2,330,454

STOCK FEEDER

Frank A. Stafford, Villisca, Iowa

Application October 10, 1942, Serial No. 461,552

5 Claims. (Cl. 119—54)

The principal object of this invention is to provide a stock feeder having an agitator therein which is operated when the stock moves the door of the feeder to get to the feed.

A further object of this invention is to provide a stock feeder utilizing agitators which pivot within the trough or hopper portion adjacent to the sides for reducing lumps and clots in the feeding material, thereby assuring the constant flow of material into the feeding trough to the limit of its capacity.

A still further object of my invention is to provide a stock feeder having a non-clogging agitator therein, and entrance doors for operating the agitator as the stock is feeding from the trough.

A still further object of my invention is to provide a stock feeder in which the feed is normally dependent on the agitator for support within the hopper.

A still further object of this invention is to provide a self feeder that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Figure 1 is a partial side view of my stock feeder ready for use.

Figure 2 is a vertical cross-sectional view of the feeder which section is taken on the line 2—2 of Figure 1.

Figure 3 is an enlarged sectional view to more fully show the agitator mechanism.

Many types of feeders have heretofore been on the market. The most serious disadvantage of these feeders resides in the agitating mechanism in that they frequently depend upon some form of stirring action to cause the feed to fall into the trough. The agitator thus channels a way through the feed if it is damp or clotted. In the case of a stock feeder, most of these mechanisms have been operated by a hog rubbing against a portion of the feeder mechanism. These methods do not adequately agitate the feeding material, inasmuch as the mechanism clogs and the feed will not go into the feeding trough. Such an agitator is also costly to manufacture and is very inefficient in use.

I have overcome such disadvantages as will be appreciated, and will hereinafter be more fully set forth.

Referring to the drawing, I have used the numeral 10 to designate the hopper or reservoir of the device having the usual hinged cover members 11 thereon as shown in the drawing. The upper side walls of the hopper slant downwardly and outwardly, and these side walls I have designated by the numeral 12. By sloping these walls outwardly, feed cannot clog in the upper part of the hopper. The numeral 13 indicates the side wall of the lower hopper portion of the device terminating at the feeding trough 14 in the usual manner. The numerals 15 designate swinging doors hinged at their upper ends to the side walls of the hopper, and hanging downwardly to a point adjacent to the trough member 14 as shown in Figure 2. The numerals 18 indicate the end wall portions of the feeder. It is to such a structure that my agitating means is attached and which I will now describe.

The agitator members 20, preferably fabricated of wood and approximately the same size as the doors, are pivotally mounted at their lower ends on shafts 19 which extend through the feeder. These agitators slant upwardly and outwardly adjacent to the hinged doors at their upper ends as shown in Figures 2 and 3. The position of these agitators causes them to act as retaining walls for the feed or mash. The agitators are provided with pegs 21 at their lower and inner ends.

A slot 27 is formed in the lower portion of the partitions 24 to receive a removable board 28 adapted to restrict the opening when hull grain or the like is used.

The hinged portion of the doors is formed by elongated square blocks 16 which are attached to the upper portion of the door. A transverse shaft 17 positioned parallel to the side walls of the hopper passes longitudinally through the square blocks which are rotatably mounted thereon. The blocks are provided with ears or levers 22 at their lower inside corners, the top of the agitator being adapted to rest against these ears. By this arrangement, when the doors are swung inwardly by the stock, the blocks 16 are revolved and the ears 22, moving in an arc, cause the agitator members 20 to shift to the position shown by the dotted lines in Figures 2 and 3. It is apparent that this movement throws the mash or feed inwardly and downwardly towards the trough, the pegs 21 serving to break up any clots that may have formed.

In order to prevent the feed from clogging the upper movable portions of my feeder, I have provided baffle plates 23 which extend inwardly and downwardly from the walls of the feeder to cover the hinge mechanism. An eaves portion 25 which serves to hold the baffle plate, extends outwardly from the side walls of the feeder to protect the doorway from rain water and the like. A partition 24 is provided between each door and agitator to prevent the feed from shifting within the hopper. The floor 26 of the trough is preferably slanted or curved towards the outer edge of the feeder so that any water which may collect within the hopper will drain away.

Thus it will be seen that I have provided a stock feeder which fulfills all of my objectives, and presents many more obvious advantages. The pivotal motion of the agitators continuously rolls the material inwardly and downwardly across the pegs, permitting it to feed through the hopper, and assuring an adequate supply of feed within the trough 14 at all times. In view of the structure of the device, every small movement of the doors 15 will provide leverage to operate the agitators and it is immaterial where the stock feeds as the agitators are operated separately. My device is economical in structure and there are no moving parts which are likely to interfere with the feeding of the stock and the device is also structurally strong and simple.

Some changes may be made in the construction and arrangement of my improved stock feeder without departing from the real spirit and purpose of my invention, and it is my intention to cover by my claims any modified forms of structure or use of mechanical equivalents which may be reasonably included within their scope.

I claim as my invention:

1. In a stock feeder, a hopper, a trough positioned below the hopper, a door, hinged at its upper end, mounted within the walls of the hopper, an agitator pivotally mounted at its lower end and inclined at its upper end towards the hinged portion of the door and means whereby the movement of the door hinge will actuate the agitator.

2. In a stock feeder, a hopper, a trough positioned below the hopper, a door mounted in the side walls of the hopper by means of a hinge, an agitator pivotally mounted at its lower end and inclined towards and adapted to rest adjacent to the door hinge, and lever means mounted on the hinge for actuating the agitator when the door is moved inwardly.

3. In a stock feeder, a hopper, a trough positioned below the hopper, a shaft extending through the hopper, a door rotatably mounted on the shaft and disposed in the side wall of the hopper, a lever means extending inwardly from the door mounting means, and an agitator member pivotally mounted at its lower end and so positioned that the movement of the door will move the lever to cause the agitator to move.

4. In a stock feeder, a hopper, a trough positioned below the hopper, the walls of the hopper having doors hingedly mounted therein, levers extending inwardly from the hinges, agitator members pivotally mounted at their lower ends and extending upwardly and outwardly in an inclined plane and adapted to rest against the outer ends of the levers, and a baffle plate extending inwardly and downwardly above the lever means.

5. In a stock feeder, a trough, a hopper having a door hingedly mounted in a side wall thereof, an agitator pivotally mounted at its lower end within the hopper and means actuated by the door hinge for moving the top portion of the agitator inwardly.

FRANK A. STAFFORD.